United States Patent [19]
Krishnamurthi et al.

[11] Patent Number: 6,134,434
[45] Date of Patent: Oct. 17, 2000

[54] SYSTEM AND METHOD FOR PROVIDING SERVICE NEGOTIATION IN A COMMUNICATIONS NETWORK

[75] Inventors: Rajeev Krishnamurthi; Bibhu P. Mohanty; Roy F. Quick, Jr.; Chih-ping Hsu, all of San Diego, Calif.

[73] Assignee: QUALCOMM Incorporated, San Diego, Calif.

[21] Appl. No.: 08/986,489

[22] Filed: Dec. 8, 1997

[51] Int. Cl.[7] ................................................... H04L 12/26
[52] U.S. Cl. ........................... 455/419; 455/418; 370/335
[58] Field of Search ..................................... 455/414, 418, 455/419, 420, 466, 517, 560, 403, 423, 412, 425, 551, 575; 370/335, 342, 493, 494, 495, 328, 329, 331

[56] References Cited

U.S. PATENT DOCUMENTS

| | | | |
|---|---|---|---|
| 5,420,863 | 5/1995 | Taketsugu et al. | 370/95.3 |
| 5,664,004 | 9/1997 | Durchman et al. | 455/466 |
| 5,751,802 | 5/1998 | Carr et al. | 379/201 |
| 5,878,036 | 3/1999 | Spartz et al. | 370/335 |
| 5,887,254 | 3/1999 | Halonen | 455/419 |

*Primary Examiner*—Wellington Chin
*Assistant Examiner*—Pablo Tran
*Attorney, Agent, or Firm*—Russell B. Miller; Sean English

[57] ABSTRACT

A system and method for providing subscriber unit or base station initiated service negotiation in a wireless communication system. Message generators in the mobile switching center, base station, and subscriber unit compose messages to be transmitted in association with the service negotiation, while message processors analyze received messages in order to direct the message generators to compose the appropriate response messages. In a subscriber unit initiated service negotiation, the subscriber unit initiates service negotiation by sending a Service Request Message to the base station containing the requested service configuration. The base station then checks with the mobile switching center to ensure that the requested service configuration is authorized for use by the particular subscriber unit. In a base station initiated service negotiation, the base station determines the appropriate service configuration to be used, and includes it in a Change Service Request message transmitted to the mobile switching center. The mobile switching center checks the service configuration to ensure that it is authorized for the particular subscriber unit. The present invention also provides support for service negotiation during soft handoff. In soft handoff using circuit mode transport for inter base station communication, the new service configuration is presented to all target base stations via the mobile switching center.

41 Claims, 4 Drawing Sheets

SYSTEM AND METHOD FOR PROVIDING SERVICE NEGOTIATION IN A COMMUNICATIONS NETWORK

BACKGROUND OF THE INVENTION

I. Field of the Invention

The present invention relates to communications. More particularly, the present invention relates to a system and method for performing service negotiation as initiated by a subscriber unit or a base station.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and amplitude modulation (AM) schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention and incorporated by reference herein.

In the wireless CDMA system, a large number of wireless subscriber units, each having a transceiver, communicates through satellite repeaters or terrestrial stations which are also referred to as cells. Each cell includes a physical plant called a base station. A cell covers a limited geographic area and routes calls carried over subscriber units to and from a telecommunication network via a mobile switching center. When a subscriber moves into the geographic area of a new cell, the routing of that subscriber's call may be eventually made through the new cell by a process called a "handoff."

A subscriber unit transmits a signal that is received by a base station. The signal is then relayed to a mobile switching center which in turn routes the signal to the public switched telephone network and to telephone lines or other subscriber units. Similarly, a signal may be transmitted from the public switched telephone network to a subscriber unit via a base station and a mobile switching center. The communications channel allocated for communication of information between the subscriber unit and the base station is called the traffic channel.

The interface between the subscriber unit and the base station is referred to as the air interface. The telecommunications industry association (TIA) has provided a standard for CDMA call processing on the air interface entitled "IS-95 Mobile Station - Base Station Compatibility Standard for Dual Mode Wideband Spread Spectrum Cellular System." Addendum to IS-95 are provided as Telecommunications Service Bulletins (TSB). The standard IS-95+ TSB74 includes provisions for service negotiation on the air interface and is incorporated herein by reference. The interface between the base station and the mobile switching center is referred to as the A interface. The TIA has provided for call processing on the A interface through the standard provided in "IS-634 Mobile Switching Center - Base Station Interface for Public 800 MHz," which is also incorporated herein by reference. IS-95-A and IS-634 both define the messages and signals that are sent on their respective interfaces for the operation of a CDMA wireless system.

The call flow in a CDMA system requires processing on both the air interface and the A interface. The successful progression of a call requires that the proper messages and signals are sent at the right times on both the air interface and the A interface. The IS-634 standard is being developed to provide for call processing on the A interface. A number of problems and deficiencies are present in IS-634 which currently does not support some of the necessary operations on the A interface.

One deficiency in IS-634 is in the handling of the service negotiation procedure. Service negotiation is performed between a subscriber unit and a base station to determine the air interface configuration for different services. The configuration includes the forward and reverse transmission rates, the forward and reverse framing formats (multiplex option), and the services associated with different logical connections (service options). Service options refer to the service capabilities of the system, and may be applications such as voice, data, facsimile, or SMS.

Although messages associated with service negotiation are well defined for the air interface, messages must also be defined for the A interface to support the service negotiation procedure. The mobile switching center needs to be involved in service negotiation because it stores information necessary for service negotiation and authorizes use of any specific service configuration for a call. The information may not otherwise be available to the base station and the subscriber unit. The information stored in the mobile switching center includes the Subscribed Services Record, which lists the services that a subscriber unit is authorized to use. The Subscribed Services Record needs to be accessed to properly negotiate the service configuration for the subscriber unit.

Additionally, A interface messages may be needed to properly handle a service negotiation procedure which is occurring while the call is in a soft handoff across multiple base stations. A handoff may be necessary if a subscriber unit moves from the coverage area of a source base station to the coverage area of target base station or base stations. In a soft handoff using circuit mode transport for inter base station communication, the source and target base stations do not communicate directly with one another. Instead, they communicate via the mobile switching center. Thus, if service negotiation occurs while the call is in soft handoff, the parameters associated with the negotiated service configuration must be provided to the target base stations through the mobile switching center. The A interface protocol should accommodate this function.

These problems and deficiencies are recognized and solved by the present invention in the manner described below.

SUMMARY OF THE INVENTION

The present invention is a system and method for providing improved messaging on the interface between a mobile switching center and a base station, also known as the A interface, of a wireless communication system. The present invention recognizes that the A interface, as previously defined by the IS-634 standard, does not properly handle service negotiation as initiated by a subscriber unit or a base station under certain circumstances. For example, information stored in the mobile switching center and needed for service negotiation may not be available during service negotiation. Such information includes the Subscribed Services Records, which lists the services that a particular subscriber unit is authorized to use. Furthermore, previous procedures were unable to properly handle a service negotiation procedure which occurred while the call is in soft handoff. Subscriber unit and base station initiated service negotiation are introduced on the A interface to provide the improvements.

In a wireless communication system, service negotiation is the process by which a subscriber unit negotiates with the network to establish the air interface configuration for different wireless services. This configuration includes the forward and reverse transmission rates, the forward and reverse framing formats (multiplex option), and services associated with different logical connections (service options). Service options refer to the service capabilities of the system, and may be applications such as voice, data, facsimile, or Short Message Service (SMS). Presently, service negotiation is defined on the air interface to permit service negotiation between the subscriber unit and the base station. The present invention introduces service negotiation on the A interface associated with subscriber unit or base station initiated service negotiation.

In accordance with the present invention, message generators in the mobile switching center, base station, and subscriber unit compose the messages transmitted to facilitate service negotiation, while message processors analyze the received messages in order to direct the message generators to compose the appropriate response messages. New messages are defined on the A interface for use during service negotiation.

In a subscriber unit initiated service negotiation, the subscriber unit initiates service negotiation by sending a Service Request Message to the base station containing the requested service configuration. The present invention defines a Change Service Request message which is then transmitted from the base station to the mobile switching center. The Change Service Request message will inform the mobile switching center whether or not the base station is able to support the requested service configuration. The mobile switching center checks the requested service configuration against the Subscribed Services Record for the subscriber unit, and may accept the requested service configuration by transmitting a Change Service Confirm message to the base station, or propose a modified service configuration by transmitting a Change Service Response message to the base station. The base station then negotiates with the subscriber unit based on the modified service configuration proposed by the mobile switching center. The service configuration resulting from the negotiation between the subscriber unit and the base station is transmitted by the base station to the mobile switching center in a Change Service Request message. A message processor in the mobile switching center analyzes the negotiated configuration, and may either accept the configuration by sending a Change Service Confirm message to the base station, or propose a new configuration by sending a Change Service Response message to the base station. Thus, the process continues until the subscriber unit, the base station, and the mobile switching center agree on a service configuration.

In a base station initiated service configuration, the base station determines the appropriate service configuration to be used and includes it in a Change Service Request message transmitted to the mobile switching center. The mobile switching center checks the service configuration against the Subscribed Services Record for the particular subscriber unit. The mobile switching center may accept the service configuration provided by the base station by sending a Change Service Confirm message back to the base station. Alternatively, the mobile switching center may propose a modified service configuration by transmitting a Change Service Response message to the base station. The base station then negotiates with the subscriber unit based on the modified service configuration proposed by the mobile switching center. The service configuration resulting from the negotiation between the subscriber unit and the base station is transmitted by the base station to the mobile switching center in a Change Service Request message. A message processor in the mobile switching center analyzes the negotiated configuration, and may either accept the configuration by sending a Change Service Confirm message to the base station, or propose a new configuration by sending a Change Service Response message to the base station. Similar to subscriber unit initiated service negotiation, the process continues until the subscriber unit, the base station, and the mobile switching center all agree on a service configuration.

If a subscriber unit is in soft handoff while service negotiation is in progress, then additional messages are exchanged to inform the target base station or base stations of the negotiated service negotiation. In a soft handoff using circuit mode transport for inter base station communication, the source and target base stations communicate through the mobile switching center. The source base station transmits a Change Service Configuration Directive message to the mobile switching center, which in turn transmits a Change Service Configuration Directive to each target base station. Each target base station responds by transmitting a Change Service Configuration Directive Ack to the mobile switching center. When the mobile switching center has received the acknowledgment(s) from the target base station(s), it sends a Change Service Configuration Directive Ack to the source base station. For the case of soft handoff using packet mode transport, these messages can either be sent on a base station to base station interface (when selection distribution is done at the base station) or via the mobile switching center (when selection distribution is done at the mobile switching center). Accordingly, both the source base station and target base station(s) are aware of the new service configuration, and the subscriber unit may make use of the new configuration while soft handoff continues.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention provides a system and method for allowing a subscriber unit or a base station to initiate service negotiation through the mobile switching center.

Figure 1:
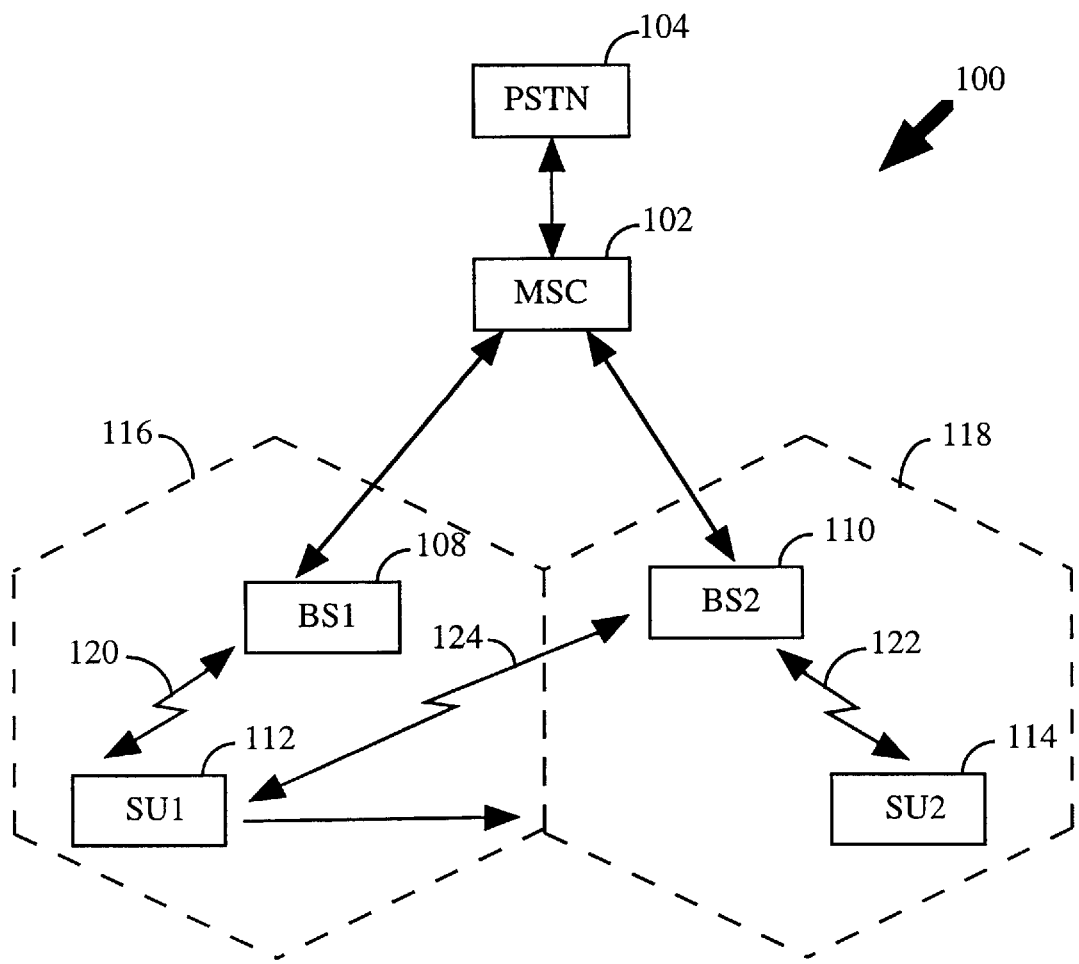
FIG. 1 is a block diagram of an exemplary wireless communication system.

An exemplary wireless communication system in which the present invention is embodied is illustrated in FIG. 1. In a preferred embodiment, the communication system is a CDMA wireless communications system, although it should be understood that the present invention is equally applicable to other types of communication systems. Systems utilizing other well known transmission modulation schemes such as TDMA and FDMA as well as other spread spectrum systems may employ the present invention.

The wireless system is indicated generally by 100 and includes a mobile switching center (MSC) 102, also referred to as a mobile telephone switching office (MTSO), that includes interface and processing circuitry for providing system control to the base stations. MSC 102 routes telephone calls from public switched telephone network (PSTN) 104 to the appropriate base station for transmission to the appropriate subscriber unit. MSC 102 also controls the routing of calls from the subscriber units via one or more base stations to PSTN 104. In addition, MSC 102 may direct calls between subscriber units via the appropriate base stations. MSC 102 may be coupled to the base stations by various conventional means, such as dedicated telephone lines, optical fiber links, or by radio frequency communications.

In FIG. 1, two exemplary base stations, BS1 108 and BS2 110, along with two exemplary subscriber units, SU1 112 and SU2 114 are illustrated. BS1 108 serves cell 1 116 of the cellular network by relaying messages between subscriber units located within cell 1 116 and MSC 102. Likewise, BS2 110 serves cell 2 118 of the cellular network by relaying messages between subscriber units located within cell 2 118 and MSC 102. As shown in FIG. 1, SU1 112 is located within cell 1 116, and SU2 114 is located within cell 2 118. SU1 112 and SU2 114 may be mobile stations (MSs) such as mobile telephones or Personal Communication System (PCS) stations, or some other wireless subscriber equipment such as the Fixed Wireless Terminal (FWT).

BS1 108 communicates with SU1 112 via link 120, which is a two-way link characterized by forward and reverse code channels. A forward link is the link from a base station to a subscriber unit, while a reverse link is the link from a subscriber unit to a base station. BS2 110 communicates with SU2 114 via two-way link 122.

If SU1 112 moves from cell 1 116 to cell 2 118, a handoff occurs. In a soft handoff, SU1 112 establishes communications link 124 with the target base station, BS2 110, in addition to existing link 120 with the source base station, BS1 108. Once SU1 112 has crossed into cell 2 118, it may drop link 120.

As previously mentioned, the interface between BSs 108 and 110 and SUs 112 and 114 is called the air interface, and for the purposes of the present invention, call processing on the air interface is governed by IS-95+TSB74. Also as previously mentioned, the interface between MSC 102 and BSs 108 and 110 is called the A interface, and call processing on the A interface is governed by IS-634. The present invention recognizes that the A interface as previously defined by IS-634 lacks support for the successful completion of service negotiation under certain circumstances. In addition, the present invention recognizes that the A interface protocol may be defined to provide the necessary support for service negotiation procedures.

As previously discussed, service negotiation is performed between a subscriber unit and a base station to determine the air interface configuration for different services. Referring back to system 100 in FIG. 1, service negotiation may be initiated by a subscriber unit such as SU1 112 or SU2 114, a base station such as BS1 108 or BS2 110, or a mobile switching center such as MSC 102. MSC initiated service negotiation is disclosed in copending patent application Serial No. 08/986,488, filed De. 8, 1997 entitled "SYSTEM AND METHOD FOR MOBILE SWITCHING CENTER INITIATED SERVICE NEGOTIATION," which is assigned to the assignee of the present invention and incorporated by reference herein. The present invention is directed to service negotiation initiated by a subscriber unit or a base station.

Whether initiated by a subscriber unit or a base station, the mobile switching center needs to be involved in service negotiation procedures. For instance, the service negotiation procedure may need to access information which is stored in the mobile switching center but not available in the base station or the subscriber unit. An example of such information is the Subscribed Services Record for a particular subscriber unit. The Subscribed Services Record includes a list of services that a subscriber unit is authorized to use, and will be utilized by the service negotiation procedure to properly determine the service configuration for the subscriber unit.

Another instance wherein the mobile switching center should be involved in service negotiation is when service negotiation occurs while a subscriber unit is in soft handoff. In a soft handoff using circuit mode transport for inter base station communication, the base stations involved in the handoff communicate through the mobile switching center. In order to convey information regarding the negotiated service configuration from the source base station to the target base station(s), the mobile switching center must be involved. Thus, improvements are defined on the A interface so that the mobile switching center is involved in the service negotiation procedure when necessary.

Figure 2:
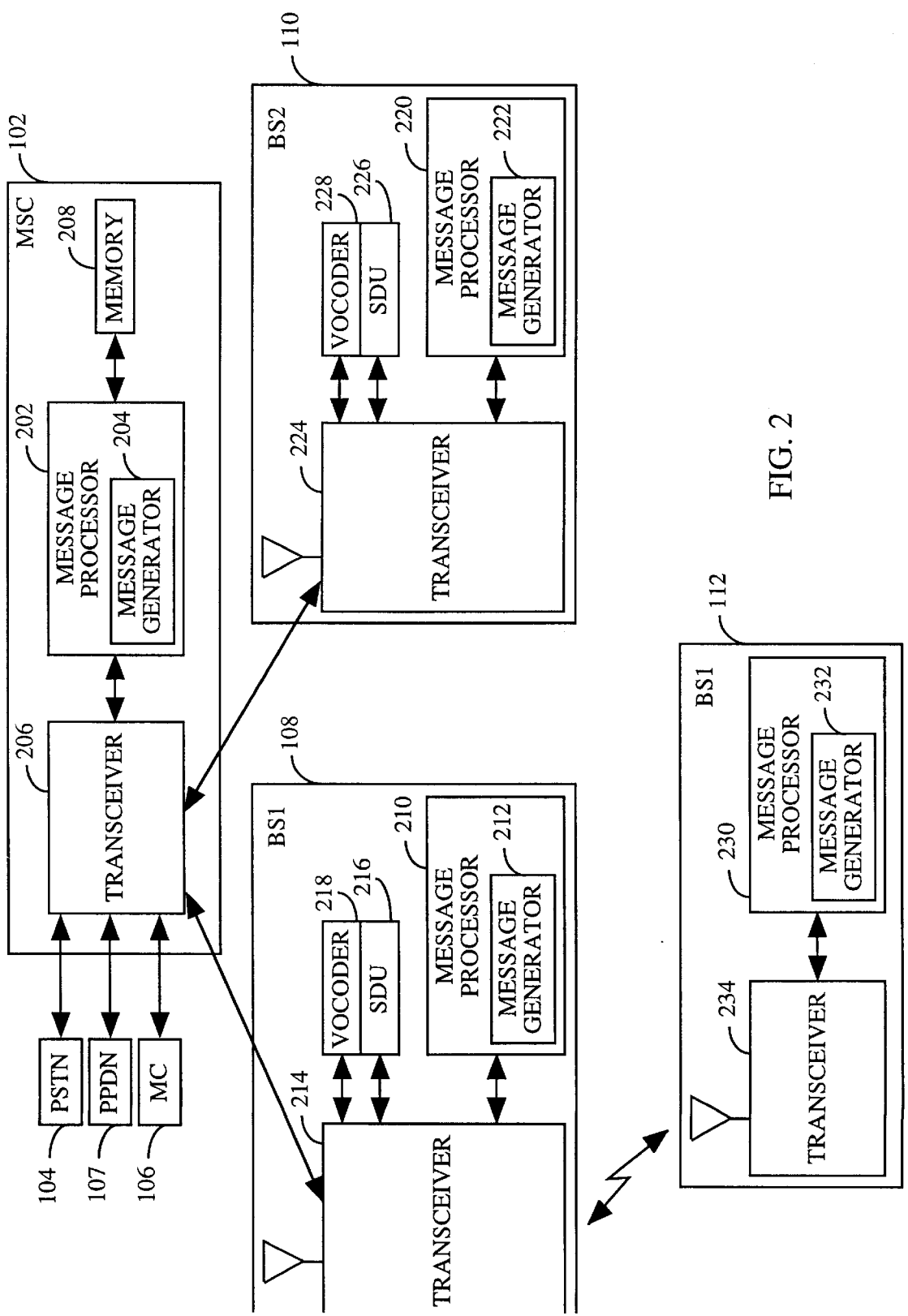
FIG. 2 is a block diagram illustrating a system for implementing subscriber unit or base station initiated service negotiation in accordance with the present invention.

Referring now to FIG. 2, a diagram is shown illustrating the processing elements of system 100 (FIG. 1) used for SU or BS initiated service negotiation. MSC 102 is comprised of a message processor 202 which processes the messages associated with service negotiation. Message generator 204 of message processor 202 generates the messages associated with service negotiation. Transceiver 206 transmits and receives messages associated with the service negotiation. In addition, MSC 102 comprises memory 208, which stores the Subscribed Services Records for the subscriber units serviced by system 100. A Subscribed Services Record contains a list of service options that a particular subscriber unit is authorized to use.

BS1 108 is comprised of message processor 210 for processing messages associated with service negotiation, message generator 212 for generating messages associated with service negotiation, and transceiver 214 for transmitting and receiving messages associated with service negotiation. In a preferred embodiment, BS1 108 comprises Selection Distribution Unit (SDU) 216 for multiplexing and demultiplexing of traffic frames and vocoder 218 for encoding and decoding the received speech. An exemplary embodiment of a vocoder is described in U.S. Pat. No. 5,414,796, entitled "VARIABLE RATE VOCODER," assigned to the assignee of the present invention and incorporated by reference herein. In alternative embodiments, SDU 216 and vocoder 218 may be elements of MSC 102 instead of BS1 108.

BS2 110 is comprised of message processor 220, message generator 222, transceiver 224, SDU 226, and vocoder 228, which perform similar functions as message processor 210, message generator 212, transceiver 214, SDU 216, and vocoder 218, respectively.

SU1 112 is comprised of message processor 230 for processing messages associated with service negotiation, message generator 232 for generating messages associated with service negotiation, and transceiver 234 for transmitting and receiving messages associated with service negotiation.

Referring still to FIG. 2, in a SU initiated service negotiation, message generator 232 of SU1 112 generates a Service Request Message for transmission to the appropriate base station via transceiver 234. The Service Request Message contains the service configuration requested by SU1 112.

Assuming that SU1 112 is located within the coverage area of BS1 108, the Service Request Message will be received by transceiver 214 of BS1 108. The Service Request Message is relayed to message processor 210, which analyzes the message and causes message generator 212 to generate a response message. In a preferred embodiment, a Change Service Request message is generated by message generator 212. The Change Service Request message is transmitted to MSC 102 via transceiver 214.

At MSC 102, transceiver 206 receives the Change Service Request message and presents it to message processor 202. Message processor 202 analyzes the Change Service Request message. The analysis may be based on the Subscribed Services Record for SU1 112 stored in memory 208. Message processor 202 then instructs message generator 204 to form the appropriate response message.

Accordingly, further messages are exchanged between MSC 102, BS1 108, and SU1 112. Message processors 202, 210, and 230 of MSC 102, BS1 108, and SU1 112, respectively analyze the received messages, and message generators 204, 212, and 232 of MSC 102, BS1 108, and SU1 112, respectively construct appropriate response messages. The message exchanges continue until a new service configuration for SU1 112 is agreed upon. This is generally signaled by an Assignment Complete message transmitted from BS1 108 to MSC 102.

After completion of service negotiation, the negotiated service configuration is used for transmitting data and voice messages associated with the call. For example, the service configuration may call for voice to be transmitted as a service option. Thus, speech signals from PSTN 104 will be transmitted to SU1 112 via MSC 102 and BS1 108. The data rate will be the rate prescribed by the service configuration. In BS1 108, vocoder 218 may encode the speech prior to transmission to SU1 112. In the reverse direction, speech from SU1 112 is transmitted to PSTN 104 via BS1 108 and MSC 102. Vocoder 218 may decode the vocoded speech it receives from SU1 112 prior to transmitting the speech to MSC 102. In some cases, the service configuration may call for data associated with more than one service option to be delivered. In this case, in the forward direction, SDU 216 may multiplex the data associated with the different service options for transmission to SU1 112, and in the reverse direction, SDU 216 may demultiplex the data associated with the different service options for delivery to the appropriate processing elements.

During the course of a call, a handoff is necessary if SU1 112 moves from the coverage area of the source base station, BS1 108, to the coverage area of a target base station or base stations. Still referring to FIG. 2, the processing elements involved in a soft handoff situation are illustrated. A single target base station, BS2 110, is shown, although it should be understood that there may be multiple base stations.

If service negotiation occurs while SU1 112 is in soft handoff, in order for the negotiated service configuration to take effect, BS2 110 needs to be informed of the negotiated service configuration. In a soft handoff using circuit mode transport for inter base station communication, BS2 110 is informed of the new service configuration via MSC 102. This is accomplished by having BS1 108 transmit a Change Service Configuration Directive message to MSC 102, which in turn transmits a Change Service Configuration Directive message to BS2 110, informing BS2 110 of the new service configuration. The Change Service Configuration Directive is received by transceiver 224 and relayed to message processor 220 for analysis. In response, message generator 222 of BS2 110 generates a Change Service Configuration Directive Ack, which is transmitted by transceiver 224 to MSC 102. MSC 102 in turn transmits a Change Service Configuration Directive Ack to BS1 108. The source base station (BS1 108) and the target base station (BS2 110) are now both aware of the new service configuration for SU1 112. The call can subsequently proceed using the new service configuration after SU1 112 receives a Service Connect Message from BS1 108.

If instead soft handoff uses packet mode transport for inter base station communication, the Change Service Configuration Directive and Change Service Configuration Directive Ack messages may be sent directly from BS1 108 to BS2 110 on a BS—BS interface. This is the case when the selection distribution function is performed at the base station, i.e., that SDUs 216 and 226 are base station elements. Alternatively, the messages may be sent via MSC 102 when selection distribution is performed at the mobile switching center, i.e., that SDUs 216 and 226 are elements of the mobile switching center instead.

Figure 3:
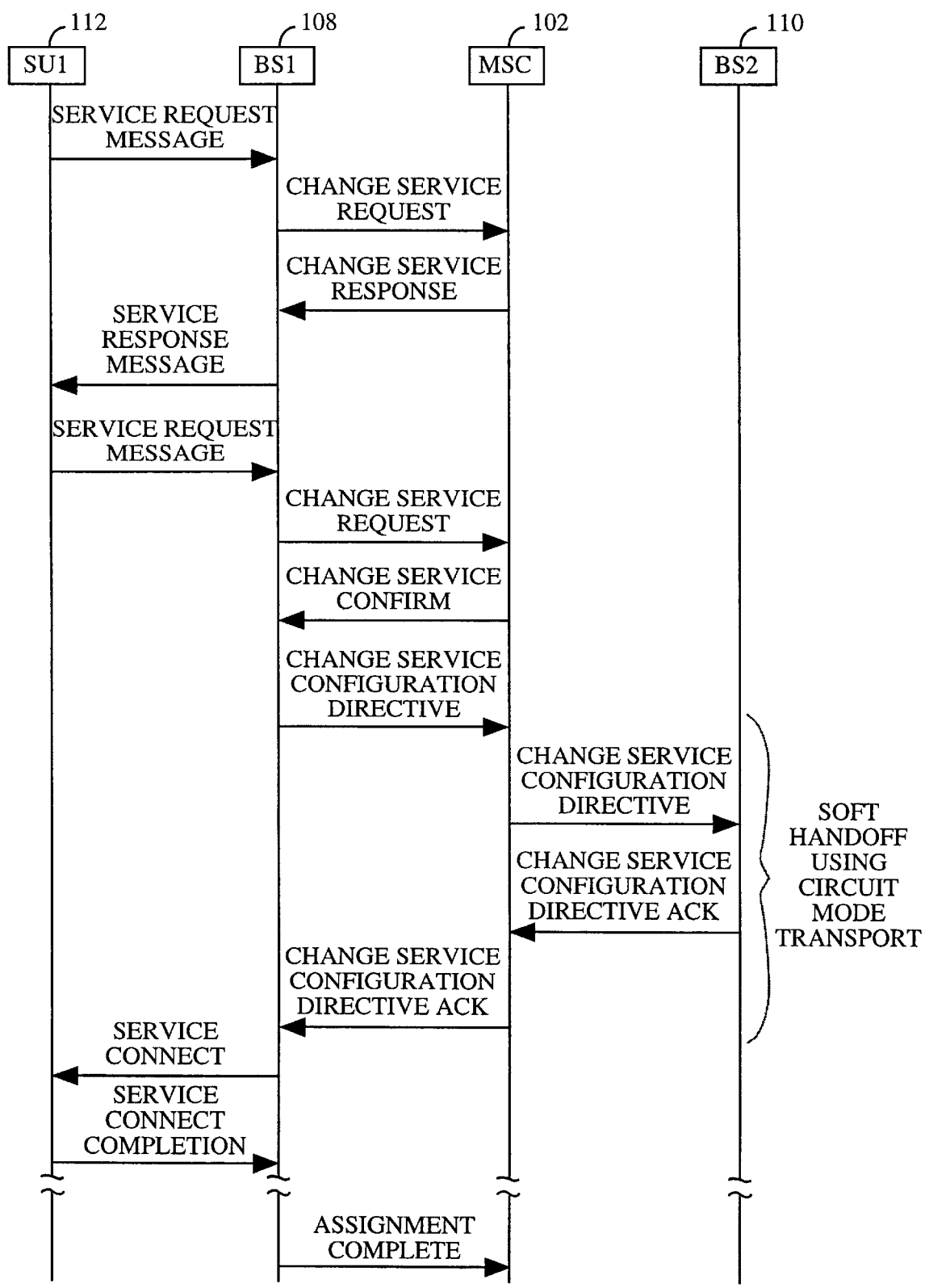
FIG. 3 is a flow diagram illustrating a subscriber unit initiated service negotiation procedure with or without base station soft handoff using circuit mode transport.

Referring now to FIG. 3, a flow diagram is shown illustrating the messages transmitted between the processing elements of FIG. 2 during a SU initiated service negotiation. FIG. 3 also illustrates the messages transmitted when a SU initiated service negotiation occurs while SU1 112 is in soft handoff using circuit mode transport.

SU1 112 initiates service negotiation by sending a Service Request Message to BS1 108 containing the requested service configuration. BS1 108 includes the requested service configuration in a Change Service Request message for transmission to MSC 102. The Change Service Request message includes a Service Negotiation Query element. The QUERY flag of the element is set to '1' if BS1 108 is unable to support the requested service configuration or if it determines that further negotiation is needed. The QUERY flag is set to '0' if BS1 108 is capable of supporting the requested service configuration.

If the QUERY flag is set to '0', MSC 102 may respond by sending a Change Service Confirm message to BS1 108 authorizing the service change request. The Change Service Confirm message includes the authorized Service Configuration Record which is consistent with the Subscribed Services Record for SU1 112. Instead, MSC 102 may send a Change Service Response message, including either a modified Service Configuration Record or a Subscribed Services Record. The Service Configuration Record will contain the service configuration proposed by MSC 102. The Subscribed Services Record, as described above, contains a list of service options that SU1 112 is authorized to use. If the QUERY field is set to '1' in the Change Service Request message, then the Change Service Response Message includes the Subscribed Services Record. The Subscribed Services Record provided by MSC 102 will permit BS1 108 and SU1 112 to properly negotiate an appropriate service configuration.

Upon receipt of the Change Service Response message from MSC 102, BS1 108 sends a Service Response Message to SU1 112 containing a Service Configuration Record. The Service Configuration Record may be the one transmitted from MSC 102, or one composed by BS1 108 based on the received Subscribed Services Record.

SU1 112 responds to the Service Response Message by sending a Service Request Message back to BS1 108. The Service Request Message either accepts the proposed service configuration or proposes a new one.

If BS1 108 agrees with the service configuration contained in the Service Request Message received from SU1 112, BS1 108 will respond by sending a Change Service Request message to MSC 102. BS1 108 will set the QUERY flag to '0' in the Service Negotiation Query element of the Change Service Request message to indicate that no additional information is requested by BS1 108 from MSC 102, i.e., that BS1 108 is capable of supporting the negotiated service configuration. Thus, the Change Service Request message transmitted to MSC 102 informs MSC 102 of the negotiated service configuration. If BS1 108 does not agree with the service configuration contained in the Service Request Message received from SU1 112, BS1 108 and SU1 112 will further exchange Service Response Messages and Service Request Messages until a service configuration is agreed upon by BS1 108 and SU1 112.

In response to the Change Service Request Message, MSC 102 may send a Change Service Confirm message to BS1 108, authorizing the Change Service Request. Alternatively, MSC 102 may send a Change Service Response message, causing the exchange of Service Response Message, Service Request Message, and Change Service Request message to be repeated until MSC 102, BS1 108, and SU1 112 reach an agreement. A series of messages are then exchanged for the new service configuration to become active. A Service Connect message is sent from BS1 108 to SU1 112, and SU1 112 responds with a Service Connect Completion message. These messages are followed by an Assignment Complete message from BS1 108 to MSC 102 to inform MSC 102 that the new service configuration is now available. The new service configuration may then be utilized.

If SU1 112 is involved in soft handoff, then additional messages need to be exchanged to inform the target base station or base stations of the negotiated service configuration. Referring to FIGS. 2 and 3, a soft handoff may take place when SU1 112 moves from the coverage area of BS1 108 to the coverage area of BS2 110. In FIGS. 2 and 3, the source base station is BS1 108, and the target base station is BS2 110. It should be understood that there may be more than one target base station, in which case all target base stations will receive the same messages. FIG. 3 illustrates the messages that are transmitted during a soft handoff in a system using circuit mode transport for inter-BS communication. In circuit mode transport, BS1 108 and BS2 110 communicate with one another via MSC 102.

Thus, if SU1 112 is in soft handoff using circuit mode transport, the source base station, BS1 108, sends a Change Service Configuration Directive to MSC 102. The Change Service Configuration Directive contains the MSC approved service configuration. MSC 102 in turn sends a Change Service Configuration Directive to the target base station, BS2 110. BS2 110 returns a Change Service Configuration Directive Ack to indicate the outcome of processing the Change Service Configuration Directive. MSC 102 in turn returns to BS1 108 a Change Service Configuration Directive Ack. If more than one target base station are involved, then MSC 102 will transmit the Change Service Configuration Directive Ack to BS1 108 after consolidating the responses from the various target base stations. Consequently, both the source base station and the target base station(s) are aware of the new service configuration for SU1 112, and SU1 112 may make use of the new service configuration after service connection has been completed.

If SU1 112 is in soft handoff using packet mode transport, the Change Service Configuration Directive and Change Service Configuration Directive Ack messages will be sent on a direct interface between BS1 108 and BS2 110 when selection distribution is performed at the base stations. Alternatively, the messages are sent via MSC 102 when selection distribution is performed at the mobile switching center.

SU initiated service negotiation may be necessary in a number of situations. For example, SU initiated service negotiation may be needed during a SU call origination. In a SU call origination, a SU is placing a call to a PSTN. Thus, referring back to FIG. 2, SU1 112 may originate a call by transmitting an Origination Message, over the wireless channel, to BS1 108 to request service. If BS1 108 cannot support the default service configurations associated with the service option requested by SU1 112 in the Origination Message, BS1 108 may convey to MSC 102 the need for service negotiation by including a Service Negotiation Indicator element in a CM Service Request message transmitted to MSC 102. Additionally, BS1 108 transmits a Channel Assignment Message to SU1 112. The Channel Assignment Message contains an Assignment Mode field which serves to inform SU1 112 that service negotiation is to be performed. SU1 112 then initiates service negotiation as described above.

SU initiated service negotiation may also be necessary during a call origination when SU1 112 proposes a service option in the Origination Message that it is not authorized to use. The service option proposed by SU1 112 is transmitted by BS1 108 to MSC 102 in a CM (Connection Management) Service Request message. MSC 102 checks the proposed service configuration (containing the service option) against the Subscribed Services Record for SU1 112 stored in the memory of MSC 102. If the proposed service configuration is not authorized, then MSC 102 will transmit to BS1 108 an Assignment Request message containing a Service Negotiation Indicator element, informing BS1 108 that service negotiation is needed. In turn, BS1 108 will transmit to SU1 112 a Channel Assignment Message including an Assignment Mode field, which informs SU1 112 that service negotiation is to be performed. SU1 112 then initiates service negotiation as described above. A person skilled in the art will recognize that other situations may arise in which SU initiated service negotiation is applicable. For example, during a call, SU1 112 may propose a new service configuration.

The present invention also provides for BS initiated service negotiation. Referring to FIG. 2, in a service negotiation initiated by BS1 108, message processor 210 determines the appropriate service configuration to be used. Message processor 210 instructs message generator 212 to construct a Change Service Request message, which includes a Service Configuration Record, for transmission to MSC 102 via transceiver 214. The Change Service Request message is received by transceiver 206 of MSC 102 and relayed to message processor 202. Message processor 202 analyzes the Change Service Request message based on the Subscribed Services Record for SU1 112 stored in memory 208. Message processor 202 then instructs message generator 204 to form the appropriate response message.

If message processor 202 determines that the service configuration indicated by the Change Service Request message is appropriate, message processor 202 will instruct message generator 204 to generate a Change Service Confirm message. Transceiver 206 of MSC 102 will transmit the Change Service Confirm message to transceiver 214 of BS1 108 authorizing the new service configuration. Alternatively, message processor 202 may instruct message generator 204 to construct a Change Service Response message including either a modified Service Configuration Record or a Subscribed Services Record (which, as explained above, contains a list of acceptable service options for the subscriber). Transceiver 206 transmits the Change Service Response message, which is received by transceiver 214 of BS1 108.

Upon receipt of the Change Service Response message at BS1 108, message processor 210 instructs message generator 212 to generate a Service Request Message containing a Service Configuration Record using one or more service options from the list of allowed service options. Transceiver 214 of BS1 108 transmits the Service Request Message.

The Service Request Message is received by transceiver 234 of SU1 112. The Service Request Message is sent to processor 230 for analysis, and message generator 232 constructs the proper response message based on the analysis. Thus, further messages are exchanged between MSC 102, BS1 108, and SU1 112 until a new service configuration for SU1 112 is agreed upon. This is generally signaled by an Assignment Complete message transmitted from BS1 108 to MSC 102.

As in the SU initiated service negotiation case, after completion of service negotiation, the negotiated service configuration is used for transmitting data and voice messages associated with the call. In BS1 108, vocoder 218 will encode and decode speech if the service configuration has set voice to be a service option. SDU 216 may multiplex and demultiplex the data associated with the different service options for delivery to the appropriate processing elements.

Also as in the SU initiated service negotiation case, FIG. 2 illustrates the processing elements involved if a call is in soft handoff using circuit mode transport when BS initiated service negotiation has occurred. If a call is in soft handoff using circuit mode transport for inter base station communication, BS2 110 is informed of the new service configuration via MSC 102. This is accomplished by having BS1 108 transmit a Change Service Configuration Directive message to MSC 102, which in turn transmits a Change Service Configuration Directive message to BS2 110, informing BS2 110 of the new service configuration. The Change Service Configuration Directive is received by transceiver 224 and relayed to message processor 220 for analysis. In response, message generator 222 of BS2 110 generates a Change Service Configuration Directive Ack, which is transmitted by transceiver 224 to MSC 102. MSC 102 in turn transmits a Change Service Configuration Directive Ack to BS1 108. Since the source base station (BS1 108) and the target base station (BS2 110) are both aware of the new service configuration for SU1 112, the call can proceed using the new service configuration after service connection has been completed.

Figure 4:
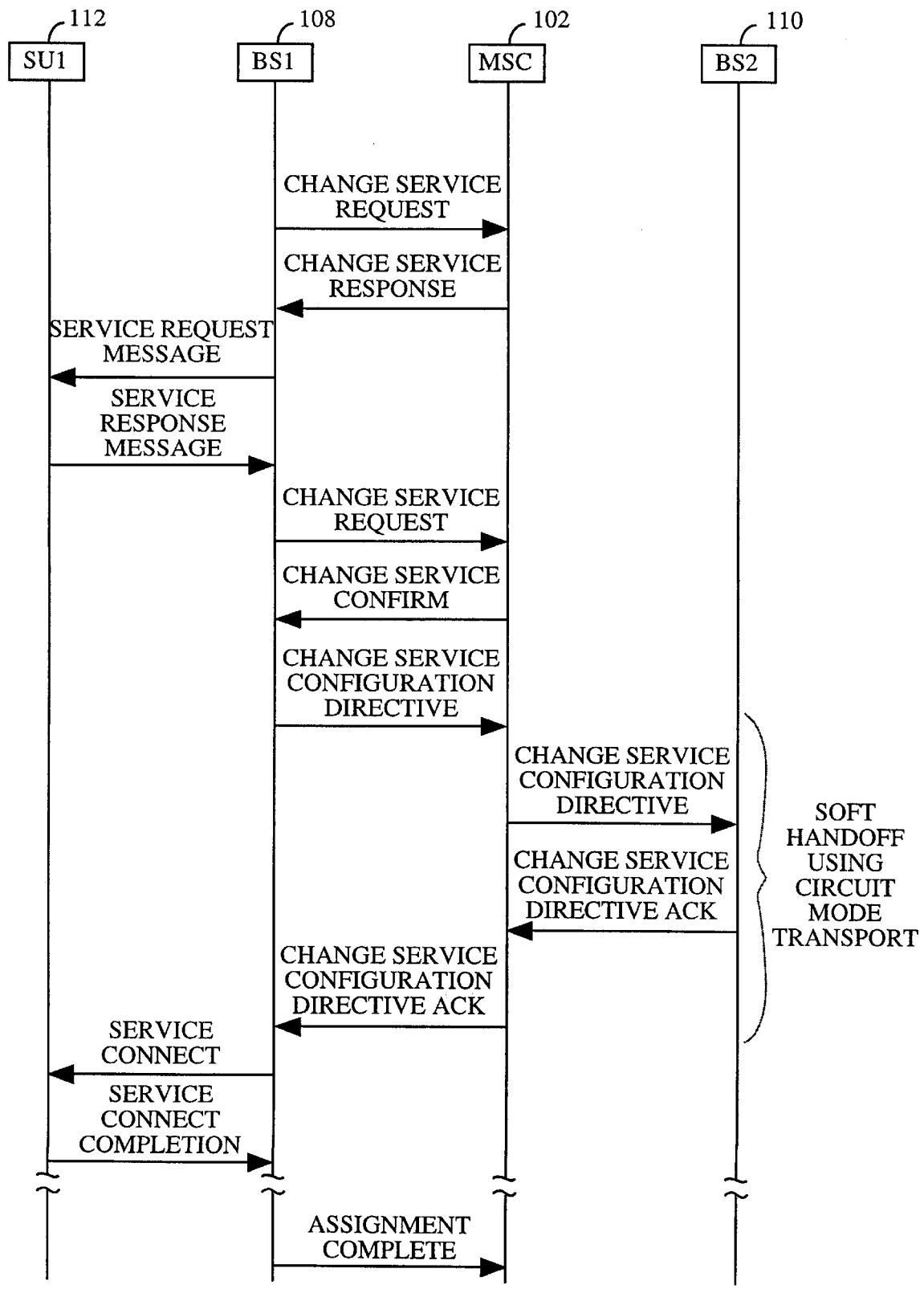
FIG. 4 is a flow diagram illustrating a base station initiated service negotiation procedure with or without base station soft handoff using circuit mode transport.

Referring now to FIG. 4, a flow diagram is shown illustrating the messages transmitted between the processing elements of FIG. 2 during BS initiated service negotiation. FIG. 4 also illustrates the messages transmitted when BS initiated service negotiation occurs while SU1 112 is in soft handoff using circuit mode transport.

BS1 108 initiates service negotiation by sending a Change Service Request Message to MSC 102. BS1 108 determines the appropriate service configuration to be used and includes it as Service Configuration Record in the Change Service Request message. The Change Service Request message includes a Service Negotiation Query element. The QUERY flag of the element is set to '1' if BS1 108 determines that further negotiation is needed. The QUERY flag is set to '0' if BS1 108 is capable of supporting the proposed service configuration.

If the QUERY flag is set to '0', MSC 102 may respond by sending a Change Service Confirm message to BS1 108 authorizing the service change request. The Change Service Confirm message includes the authorized Service Configuration Record which is consistent with the Subscribed Services Record for SU1 112. Instead, MSC 102 may send a Change Service Response message, including either a modified Service Configuration Record or a Subscribed Services Record. The Service Configuration Record will contain the service configuration proposed by MSC 102. The Subscribed Services Record, as described above, contains a list of service options that SU1 112 is authorized to use. If the QUERY field is set to '1' in the Change Service Request message, then the Change Service Response Message includes the Subscribed Services Record. The Subscribed Services Record provided by MSC 102 will permit BS1 108 and SU1 112 to properly negotiate an appropriate service configuration.

Upon receipt of the Change Service Response message from MSC 102, BS1 108 sends a Service Request Message to SU1 112 containing a Service Configuration Record. The Service Configuration Record will list one or more service options from the list of service options allowed for SU1 112.

SU1 112 responds to the Service Request Message by sending a Service Response Message back to BS1 108. The Service Response Message will either accept the service configuration contained in the Service Request Message from BS1 108, or propose a new one.

Upon receipt of the Service Response Message from SU1 112, if BS1 108 agrees with the service configuration from SU1 112, BS1 108 will construct a Change Service Request message containing the service configuration from SU1 112. This is the negotiated service configuration. BS1 108 sets the QUERY flag to '0' in the Service Negotiation Query element of the Change Service Request message to indicate that no additional information is requested by BS1 108 from MSC 102, i.e., that BS1 108 is capable of supporting the negotiated service configuration. The Change Service Request message thus informs MSC 102 of the negotiated service configuration. If BS1 108 does not agree with the service configuration from SU1 112, BS1 108 and SU1 112 will further exchange Service Request Messages and Service Response Messages until an agreement is reached.

In response to the Change Service Request Message, MSC 102 may send a Change Service Confirm message to BS1 108, authorizing the Change Service Request. Alternatively, MSC 102 may send a Change Service Response message, causing the exchange of Service Request Message, Service Response Message, and Change Service Request message to be repeated until MSC 102, BS1 108, and SU1 112 reach an agreement.

A series of messages are then exchanged for the new service configuration to become active. A Service Connect message is sent from BS1 108 to SU1 112, and SU1 112 responds with a Service Connect Completion message. These messages are followed by an Assignment Complete message from BS1 108 to MSC 102 to inform MSC 102 that the new service configuration is now available. The new service configuration may then be utilized.

If SU1 112 is involved in soft handoff, then additional messages are exchanged to inform the target base station or base stations of the negotiated service configuration. Referring to FIGS. 2 and 3, a soft handoff may take place when SU1 112 moves from the coverage area of BS1 108 to the coverage area of BS2 110. In FIGS. 2 and 3, the source base station is BS1 108, and the target base station is BS2 110. As explained above, there may be more than one target base station, in which case all target base stations will receive the same messages. FIG. 4 illustrates the messages that are transmitted during a soft handoff in a system using circuit mode transport for inter-BS communication. In circuit mode transport, BS1 108 and BS2 110 communicate with one another via MSC 102.

Referring to FIG. 4, in a soft handoff using circuit mode transport, the source base station, BS1 108, sends a Change Service Configuration Directive to MSC 102. The Change Service Configuration Directive contains the MSC approved service configuration. MSC 102 in turn sends a Change Service Configuration Directive to the target base station, BS2 110. BS2 110 returns a Change Service Configuration Directive Ack to indicate the outcome of processing the Change Service Configuration Directive. MSC 102 in turn returns to BS1 108 a Change Service Configuration Directive Ack. If more than one target base station are involved, then MSC 102 will transmit the Change Service Configuration Directive Ack to BS1 108 after consolidating responses from the various target base stations. Consequently, both the source base station and the target base station(s) are aware of the new service configuration for SU1 112, and SU1 112 may make use of the new service configuration after service connection is completed.

As previously discussed, soft handoff may instead use packet mode transport for inter base station communication. Using packet mode transport, the service configuration messages are sent on a direct interface between BS1 108 and BS2 110 if the selection distribution function is performed at the base stations. If the selection distribution function is performed at the mobile switching center, then the service configuration messages are sent via MSC 102.

BS initiated service negotiation may be useful in a number of situations. For example, the procedure may be needed during a SU call termination. In a SU call termination, a party in the PSTN is placing a call to a SU. Referring back to FIG. 2, MSC 102 may determine that an incoming call terminates to SU1 112. Thus, MSC 102 sends a Paging Request message to BS1 108 to initiate a mobile terminated call setup. In FIG. 2, SU1 112 is located within the coverage area of BS1 108. BS1 108 then issues a Page Message addressed to SU1 112, which acknowledges the page by transmitting a Page Response message over the access channel. A second incoming call may arrive for SU1 112. For instance, after a first incoming voice call arrives from PSTN 104, a second incoming packet data call may arrive from a public/private packet data network (PPDN) (not shown). Generally, the PPDN is coupled to the base stations. To accommodate both the voice call and the packet data call, BS1 108 will convey to MSC 102 the need for service negotiation by including a Service Negotiation Indicator element in a CM Service Request message transmitted to MSC 102. Then, MSC 102 acknowledges the need for service negotiation by including a Service Negotiation Indicator element in an Assignment Request message transmitted to BS1 108. BS1 108 may then initiate service negotiation as described above.

BS initiated service negotiation may also be needed in a number of other situations. For example, during an established call, a second call may arrive for the same subscriber unit. A user may be in an established voice call when a packet data call comes in; a user may be in a Short Message Service call when a packet data call comes in; or a user may be in a test call when a voice call comes in. Moreover, a base station may autonomously initiate service negotiation for resource control purposes by modifying the service configuration of existing calls. For example, if resources are insufficient to support existing calls at the data rate(s) being used, then BS initiated service negotiation may be utilized to lower the data rates of some or all of the calls. Furthermore, a person skilled in the art will recognize that other situations may arise in which BS initiated service negotiation is applicable.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A telecommunications messaging system, comprising:

a wireless subscriber unit;

a base station in communication with said wireless subscriber unit; and a mobile switching center in communication with said base station, said mobile switching center for determining the capabilities of said wireless subscriber unit, and for generating a message indicative of said capabilities of said wireless subscriber unit and for sending said message to said base station wherein said base station is further for performing a service negotiation with said wireless subscriber unit until an agreement on the form of service is reached between said wireless subscriber unit and said base station further for sending a message indicative of the service agreed on in said service negotiation agreement to said mobile switching center.

2. The system of claim 1 wherein said mobile switching center comprises:

an MSC message processor for analyzing received messages and for determining messages to be generated and transmitted in association with said service negotiation;

an MSC message generator for generating messages under direction from said message processor;

an MSC transceiver for transmitting and receiving messages associated with said service; and an MSC memory coupled to said MSC message processor for storing said information for said service negotiation.

3. The system of claim 1 wherein said wireless subscriber unit, said base station, and said mobile switching center communicate using code division multiple access (CDMA) modulation techniques.

4. The system of claim 2 wherein said base station comprises:

a BS message processor for analyzing received messages and for determining messages to be generated and transmitted in association with said service negotiation;

a BS message generator for generating messages under direction from said message processor; and a BS transceiver for transmitting and receiving messages associated with said service negotiation.

5. The system of claim 4 wherein said wireless subscriber unit comprises:
a SU message processor for analyzing received messages and for determining messages to be generated and transmitted in association with said service negotiation;
a SU message generator for generating messages under direction from said message processor; and
a SU transceiver for transmitting and receiving messages associated with said service negotiation.

6. The system of claim 5 wherein said BS message generator generates a first message for initiation of service negotiation, said first message being transmitted by said BS transceiver and received by said MSC transceiver.

7. The system of claim 6 wherein said MSC processor analyzes said first message and causes said MSC message generator to generate a second message responsive to said first message, said second message containing a proposed service configuration based on said information stored in said MSC memory, said second message being transmitted by said MSC transceiver and received by said BS transceiver.

8. The system of claim 7 wherein said BS processor analyzes said second message and causes said BS message generator to generate a third message responsive to said second message, said third message containing another proposed service configuration based on said proposed service configuration from said mobile switching center, said third message being transmitted by said BS transceiver and received by said SU transceiver.

9. The system of claim 8 wherein said first message is a Change Service Request message.

10. The system of claim 8 wherein said second message is a Change Service Response message.

11. The system of claim 8 wherein said information stored in said MSC memory includes authorized service options for subscriber units serviced by said mobile switching center.

12. The system of claim 8 wherein said third message is a Service Request Message.

13. The system of claim 5, further comprising a target base station in communication with said subscriber unit.

14. The system of claim 13 wherein said target base station comprises:
a BS message processor for analyzing received messages and for determining messages to be generated and transmitted in association with said service negotiation;
a BS message generator for generating messages under direction from said message processor; and
a BS transceiver for transmitting and receiving messages associated with said service negotiation.

15. The system of claim 14 wherein said BS message generator of said base station generates a fourth message containing a negotiated service configuration, and said BS transceiver of said base station transmits said fourth message.

16. The system of claim 15 wherein said fourth message is transmitted to said BS transceiver of said target base station via said mobile switching center.

17. The system of claim 15 wherein said fourth message is transmitted to said BS transceiver of said target base station on a direct interface between said base station and said target base station.

18. The system of claim 15 wherein said fourth message is a Change Service Configuration Directive message for informing said target base station of said negotiated service configuration.

19. The system of claim 5 wherein said SU message generator generates a first message for initiation of service negotiation, said first message being transmitted by said SU transceiver and received by said BS transceiver.

20. The system of claim 19 wherein said BS message processor analyzes said first message and causes said BS message generator to generate a second message responsive to said first message, said second message being transmitted by said BS transceiver and received by said MSC transceiver.

21. The system of claim 20 wherein said MSC processor analyzes said second message and causes said MSC message generator to generate a third message responsive to said second message, said third message containing a proposed service configuration based on said information stored in said MSC memory, said third message being transmitted by said MSC transceiver and received by said BS transceiver.

22. The system of claim 21 wherein said first message is a Service Request Message.

23. The system of claim 21 wherein said second message is a Change Service Request message.

24. The system of claim 21 wherein said third message is a Change Service Response message.

25. The system of claim 21 wherein said information stored in said MSC memory includes authorized service options for subscriber units serviced by said mobile switching center.

26. A method for performing service negotiation in a wireless communication system, comprising the steps of:
determining a set of capabilities of a subscriber unit at a mobile switching center;
generating a message indicative of said set of capabilities of a subscriber unit at said mobile switching center;
transmitting said message to a base station;
delivering a first message from a subscriber unit to a base station for initiating service negotiation in accordance with said message indicative of said set of capabilities of a subscriber unit; and
negotiating a new service configuration by said subscriber unit and said base station based on said message indicative of said set of capabilities of a subscriber unit.

27. The method of claim 26 wherein said step of delivering delivers a Service Request Message as said first message, said Service Request Message containing a requested service configuration.

28. The method of claim 26 wherein said wireless system is a code division multiple access (CDMA) system.

29. The method of claim 27 wherein said information provided by said mobile switching center includes authorized service options for subscriber units serviced by said mobile switching center.

30. The method of claim 29 wherein said step of negotiating comprises the steps of:
relaying said requested service configuration from said base station to said mobile switching center in a Change Service Request message;
in response to said Change Service Request message, if said requested service configuration is consistent with the authorized service options for said subscriber unit, accepting said requested service configuration as said new service configuration in a Change Service Confirm message transmitted from said mobile switching center to said base station;
in response to said Change Service Request message, if said requested service configuration is inconsistent with the authorized service options for said subscriber unit, proposing a revised service configuration in a Change Service Response message transmitted from said mobile switching center to said base station;

sending a Service Response Message in response to receipt of said Change Service Response message by said base station to said subscriber unit, said Service Response Message proposing a service configuration based on said revised service configuration;

forwarding a Service Request Message in response to receipt of said Service Response Message by said subscriber unit to said base station, said Service Request Message accepting or modifying said service configuration in said Service Response Message;

repeating the step of sending and the step of forwarding until said subscriber unit and said base station are in concurrence with a negotiated service configuration;

directing a Change Service Request message from said base station to said mobile switching center, said Change Service Request message containing said negotiated service configuration;

repeating the steps of sending, forwarding, repeating, and directing if a Change Service Response message is transmitted by said mobile switching center to said base station, said Change Service Response message indicating that said negotiated service configuration is not acceptable; and establishing said negotiated service configuration as said new service configuration if a Change Service Confirm message is transmitted by said mobile switching center to said base station.

31. The method of claim 30 further comprising the step of informing all target base stations of said new service configuration if said subscriber unit is in soft handoff.

32. The method of claim 31 wherein said step of informing comprises the steps of:

delivering a Change Service Configuration Directive message from said base station to said target base stations, said Change Service Configuration Directive informing said target base stations of said new service configuration; and responding to said Change Service Configuration Directive with Change Service Configuration Directive Ack messages.

33. The method of claim 32 wherein said step of delivering delivers said Change Service Configuration Directive message from said base station to said target base stations via said mobile switching center.

34. A method for performing service negotiation in a wireless communication system, comprising the steps of:

delivering a first message from a base station to a mobile switching center for initiating service negotiation;

determining a set of capabilities of a subscriber unit at a mobile switching center in response to said first message;

generating a message indicative of said set of capabilities of a subscriber unit at said mobile switching center;

transmitting said message to a base station;

negotiating a new service configuration by a subscriber unit and said base station based on said message indicative of said set of capabilities of a subscriber unit.

35. The method of claim 34 wherein said step of delivering delivers a Change Service Request message as said first message, said Change Service Request message containing a requested service configuration.

36. The method of claim 34 wherein said wireless system is a code division multiple access (CDMA) system.

37. The method of claim 35 wherein said information provided by said mobile switching center includes authorized service options for subscriber units serviced by said mobile switching center.

38. The method of claim 37 wherein said step of negotiating comprises the steps of:

in response to said Change Service Request message, if said requested service configuration is consistent with the authorized service options for said subscriber unit, accepting said requested service configuration as said new service configuration in a Change Service Confirm message transmitted from said mobile switching center to said base station;

in response to said Change Service Request message, if said requested service configuration is inconsistent with the authorized service options for said subscriber unit, proposing a revised service configuration in a Change Service Response message transmitted from said mobile switching center to said base station;

sending a Service Request Message in response to receipt of said Change Service Response message by said base station to said subscriber unit, said Service Request Message proposing a service configuration based on said revised service configuration;

forwarding a Service Response Message in response to receipt of said Service Request Message by said subscriber unit to said base station, said Service Response Message accepting or modifying said service configuration in said Service Request Message;

repeating the step of sending and the step of forwarding until said subscriber unit and said base station are in concurrence with a negotiated service configuration;

directing a Change Service Request message from said base station to said mobile switching center, said Change Service Request message containing said negotiated service configuration;

repeating the steps of sending, forwarding, repeating, and directing if a Change Service Response message is transmitted by said mobile switching center to said base station, said Change Service Response message indicating that said negotiated service configuration is not acceptable; and establishing said negotiated service configuration as said new service configuration if a Change Service Confirm message is transmitted by said mobile switching center to said base station.

39. The method of claim 38 further comprising the step of informing all target base stations of said new service configuration if said subscriber unit is in soft handoff.

40. The method of claim 39 wherein said step of informing comprises the steps of:

delivering a Change Service Configuration Directive message from said base station to said target base stations, said Change Service Configuration Directive informing said target base stations of said new service configuration; and responding to said Change Service Configuration Directive with Change Service Configuration Directive Ack messages.

41. The method of claim 40 wherein said step of delivering delivers said Change Service Configuration Directive message from said base station to said target base stations via said mobile switching center.

* * * * *